United States Patent [19]

Nadkarni

[11] 3,898,359

[45] Aug. 5, 1975

[54] THIN FILM MAGNETO-RESISTORS AND METHODS OF MAKING SAME

[75] Inventor: Gajanan Shivarao Nadkarni, Toronto, Canada

[73] Assignee: Precision Electronic Components (1971) Ltd., Toronto, Canada

[22] Filed: Jan. 15, 1974

[21] Appl. No.: 433,568

[52] U.S. Cl. .............. 428/209; 338/32 R; 338/32 H; 427/102; 427/103; 427/87; 428/210

[51] Int. Cl.$^{2}$ ........................ B44D 1/18; H01C 7/16

[58] Field of Search ........... 117/217, 234, 239, 106, 117/107; 357/27; 338/32 R, 32 H

[56] References Cited

UNITED STATES PATENTS

| | | | |
|---|---|---|---|
| 3,101,280 | 8/1963 | Harrison et al. | 117/106 A |
| 3,281,749 | 10/1966 | Weiss | 117/217 |
| 3,331,045 | 7/1967 | Weiss et al. | 338/32 R |
| 3,341,364 | 9/1967 | Collins | 117/106 R |
| 3,410,721 | 11/1968 | Hini | 338/32 R |
| 3,419,487 | 12/1968 | Robbins et al. | 117/106 R |
| 3,480,484 | 11/1969 | Carroll et al. | 117/106 R |
| 3,490,070 | 1/1970 | Hini | 338/32 H |
| 3,522,390 | 7/1970 | Wieder | 338/32 R |
| 3,592,708 | 7/1971 | Collins et al. | 357/27 |
| 3,617,975 | 11/1971 | Wieder | 357/27 |
| 3,674,549 | 7/1972 | Ohshita et al. | 117/106 A |

*Primary Examiner*—Cameron K. Weiffenbach

[57] ABSTRACT

Thin film magneto-resistors are made by applying to an electrically insulating substrate, for example glass or alumina, a thin coating of chromium or nickel, depositing on said coating a layer of elemental antimony or arsenic, and a layer of indium, the ratio of the mass of the antimony or arsenic layer to the mass of the indium layer being equal to the ratio of their atomic weights. Said layers are then caused to combine chemically to form a stoichiometric polycrystalline indium antimonide or indium arsenide compound semiconductor. The semiconductor is then covered with an indium coating, indium strips are formed by etching the indium coating, and then parts of the semiconductor and coatings are removed to achieve a desired electrical resistance.

22 Claims, 5 Drawing Figures

THIN FILM MAGNETO-RESISTORS AND METHODS OF MAKING SAME

BACKGROUND OF THE INVENTION

1. Field of the Invention:

This invention relates to thin film magnetoresistors and to methods of making such resistors.

2. Description of the Prior Art:

Magneto-resistors are resistive devices of semiconductor materials (e.g., III – V compound semiconductors) the electrical resistance of which changes with the magnetic field. Typical uses of the devices are in detection of magnetic fields, in electronic control systems which are associated with magnetic fields, and in contactless potentiometers. It is desirable that a change in resistance in response to a change in the magnetic field be as high as possible.

Particularly useful are semiconductors of indium antimonide. These have been made by the rather time consuming and expensive method of growing crystals. The semiconductor is adhered to a substrate, and it is known to interpose a metal grid between the semiconductor and the substrate to short-circuit Hall voltage.

SUMMARY OF THE INVENTION

According to the present invention, a stoichiometric semiconductor of indium antimonide or indium arsenide is made by forming a layer of elemental antimony or arsenic and a layer of elemental indium, and causing these layers to combine chemically. The semiconductor is bonded to an amorphous electrically insulating substrate by an electrically conductive coating, preferably of chromium, this coating serving to shortcircuit Hall voltage but being very thin and thus of high resistance compared to the resistance of the semiconductor. On the opposite surface of the semiconductor, remote from the substrate, electrically conductive indium strips are formed, also to shortcircuit Hall voltage. The semiconductor is formed into a current path of desired resistance by removing parts of the semiconductor and corresponding parts of the strips and of the coating that bonded said parts to the substrate, the remaining parts of the strips being generally perpendicular to the current path. The resultant device has high magneto-resistive sensitivity to a magnetic field.

BRIEF DESCRIPTION OF THE DRAWINGS

A preferred embodiment of the invention is illustrated, diagrammatically and not to scale, in the accompanying drawings in which.

DESCRIPTION OF THE PREFERRED EMBODIMENTS

Figure 1:
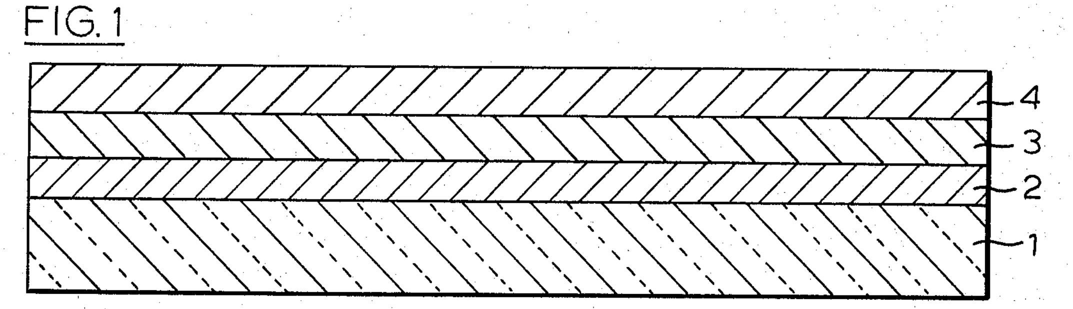
FIG. 1 is a vertical section showing layered components from which a magneto-resistor can be formed.

In the embodiment illustrated, a thin film magneto-resistor is fabricated on a substrate 1 that is amorphous and electrically insulative. A suitable substrate is glass or alumina, the upper surface of which has been carefully cleaned. The substrate is heated in a conventional vacuum coating unit (not shown) to about 200°C, and is allowed to degas for about an hour under low pressure of about $10^{-6}$ Torr or lower. While preserving this temperature and pressure, a thin coating 2 of chromium is deposited over the entire upper surface of the substrate 1, then a layer 3 of elemental antimony is deposited thereover, followed by a coextensive layer 4 of indium. The deposition of the coating 2 and of the layers 3 and 4 is completed without at any time breaking the "vacuum", i.e., without disturbing the aforesaid low pressure (except for slight increase in the pressure during deposition due to degassing of the evaporant), and the coating 2 is of as uniform thickness as possible, as is each layer 3,4. The ratio of the masses of the layers 3 and 4 is equal to the ratio of the atomic weights of the respective elements antimony and indium.

Figure 2:
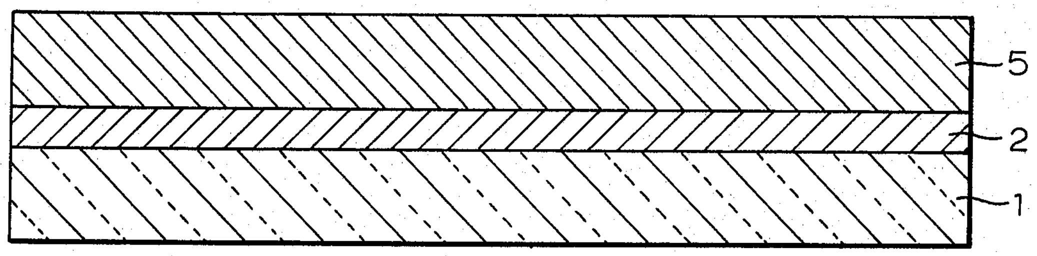
FIG. 2 is a similar section showing the components of FIG. 1 after chemical combination of the two top layers to form a compound semiconductor.
Figure 5:
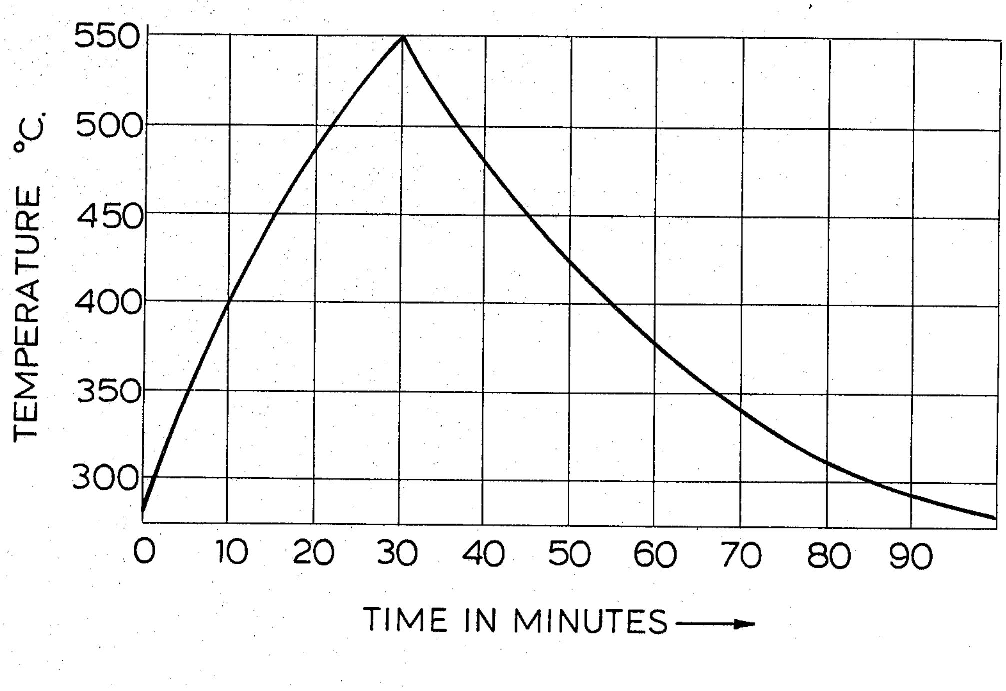
FIG. 5 shows graphically a thermal cycle suitable to accomplish the chemical combination of the two top layers of FIG. 1.

After completing the foregoing steps the device of FIG. 1 is allowed to cool to room temperature, and is removed from the vacuum coating unit. It is then put into a controlled temperature furnace (not shown) filled with an inert gas, for example, argon, the pressure of the gas being above atmospheric and the gas flow rate through the furnace being held at about four liters per hour for a furnace having a capacity of about six liters. In the furnace the device is subjected to the heating cycle illustrated in FIG. 5, wherein the temperature is increased over a period of about half an hour to a high of 550°C, after which the temperature is gradually reduced over a further period of about an hour. This treatment causes the two top layers 3 and 4 to combine chemically to form a polycrystalline stoichiometric indium antimonide semiconductor 5 (FIG. 2) firmly bonded to the chromium layer 2 which in turn is firmly bonded to the substrate 1.

Figure 3:
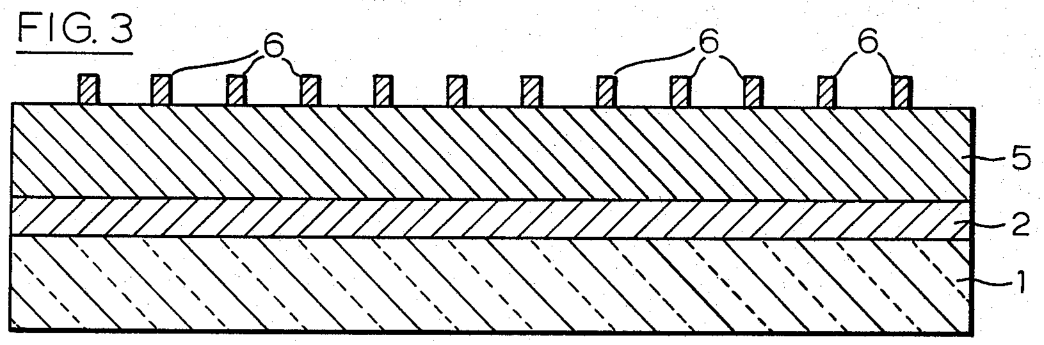
FIG. 3 is a similar section showing strips formed on the top surface of the semi-conductor.

The device of FIG. 2 is placed again in the vacuum coating unit, again at a temperature of about 100°C and pressure of about $10^{-6}$ Torr or lower, and the indium antimonide layer 5 is entirely covered with a uniform coating of elemental indium. The device is removed from the vacuum coating unit, and then, using conventional photolithographic and chemical etching techniques, parts of the indium coating are removed, leaving parallel indium strips 6 (FIG. 3, the strips running normal to the paper).

Figure 4:
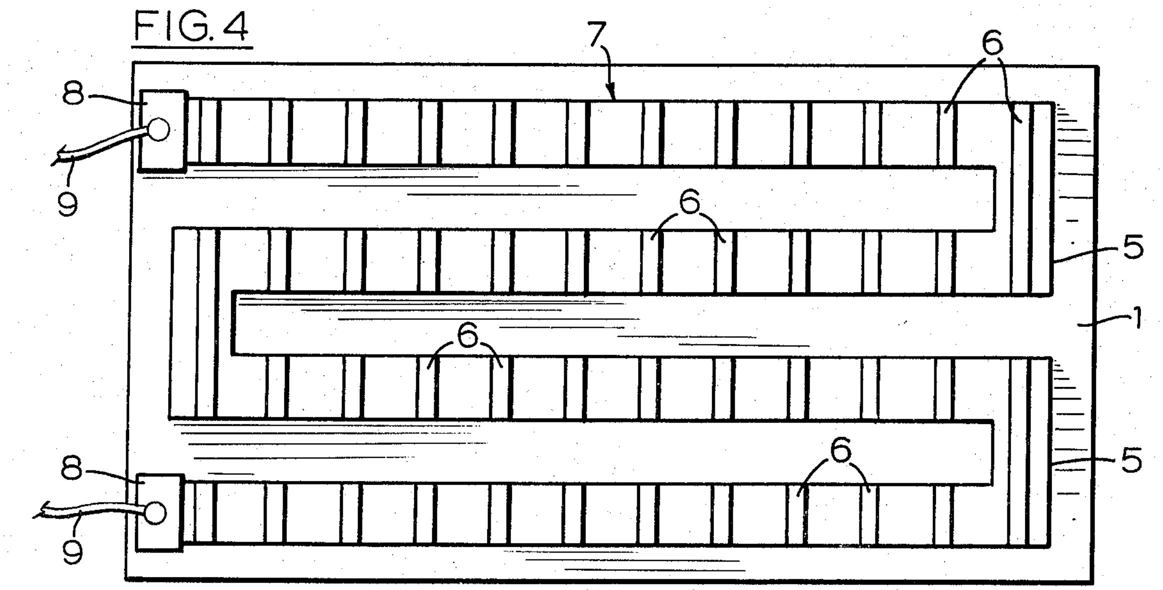
FIG. 4 is a plan view showing a finished magneto-resistor.

The final step is to remove parts of the semiconductor 5 to produce, for example, the sinuous semiconductor path 7 shown in FIG. 4, this providing an electrical current path of the resistance desired. The removal of parts of the semiconductor is also accomplished by a conventional photolithographic and chemical etching process which removes, as well, lengths of the indium strips 6 above the removed (unmasked) parts of the semiconductor, and the parts of the coating 2 therebelow. It is to be noted that the remaining parts of the strips 6, above the path 7, are generally normal to that path. The coating 2 is preserved between the path 7 and the substrate 1. In FIG. 4 conventional contact pads 8 have been connected to the ends of the path 7 and the pads are in turn connected to current leads 9.

The chromium coating between the semiconductor 5 and the substrate 1 has a twofold purpose. Firstly, it provides excellent adherence of the indium antimonide semiconductor 5 to the substrate 2. Secondly it partially shortcircuits the Hall voltage which is generated in the direction perpendicular to the current path and magnetic field, thereby increasing the sensitivity of the device over a higher range of magnetic field variations without the resistance of the device reaching a saturation value. However, the chromium coating resistance is in parallel with the semiconductor resistance, and the thickness of the coating in the finished device should be such that the resistance of the coating is much larger than the resistance of the semiconductor, for otherwise the coating would cause an appreciable reduction in the effective change in the resistance of the device when subjected to the magnetic field. Since the resistance $R_{cr}$ of the coating and the resistance $R_{InSb}$ of the semiconductor are in parallel it can easily be shown that this reduction factor equals $$\left(\frac{R_{cr}}{R_{cr}+R_{InSb}}\right)^2$$

Thus $R_{cr}$ should be much higher than $R_{InSb}$ so that the above factor is substantially unity. In most practical cases the thickness of the chromium coating should be less than 1000 A.

Instead of chromium, other electrically conductive coatings 2 might be used, for example a nickel coating, but chromium is preferable because of its superior adhesive and electrical qualities.

The indium strips 6 also serve to short-circuit the Hall voltage, increasing the sensitivity of the magnetoresistive device over a higher range of magnetic field variation without saturation. Electrically conductive strips other than indium strips might be used, for example strips of gold, silver or copper, but the indium strips, formed as described above, have an excellent bond to the semiconductor when it is formed in the described manner, so that these strips may be provided on the upper surface of the semiconductor remote from the substrate and not physically protected thereby. The strips 6 are preferably about 2500 A thick, from about one to three mils wide and separated from one another by about five to fifteen mils, but their widths and separations are not critical. Also, since these strips are discontinuous along the current path they have negligible effect on the resistance of the device, but they contribute to shorting the Hall voltage that develops in the direction perpendicular to the current path and the magnetic field.

The substrate 1 provides insulation beneath the coating 2 to prevent shortcircuiting through the substrate. Magnetic material (not shown) may be incorporated the substrate, to concentrate the magnetic field at the device, provided there is an adequate layer of electrical insulation between the magnetic material and the semiconductor path 7.

The semiconductor is preferably of indium antimonide, and forming it by chemically combining layers 3 and 4 of elemental antimony and indium is relatively quick and inexpensive, and yields a polycrystalline product of high electron mobility. The total thickness of the two layers 3 and 4, before they are chemically combined, should be at least four microns, for otherwise the electron mobility of the resultant semiconductor may be reduced because of surface scattering. The layer 3 of antimony might be replaced by elemental arsenic (the ratio of the masses of layers 3 and 4 being equal to the ratio of the atomic weights of arsenic and indium) to produce a polycrystalline indium arsenide semiconductor by the method described, though the sensitivity of such a semiconductor is lower. Although in the foregoing preferred embodiments, the layer of elemental antimony is deposited prior to the layer of elemental indium, the alternative order of deposition is not excluded.

The coatings and layers 2, 3, 4 and 6 may be applied to thermal deposition, electron gun deposition, sputtering or flash evaporation techniques. Variations not specifically described herein will no doubt occur to those skilled in the art and are intended to be covered by the following claims.

What I claim as my invention is:

1. The method of making a thin film magnetoresistor, comprising depositing an electrically conductive coating on a substrate providing insulation beneath the coating, depositing a layer of elemental antimony or arsenic and a layer of elemental indium one upon the other on the conductive coating, the ratio of the mass of the antimony or arsenic layer to the mass of the indium layer being equal to the ratio of their atomic weights, and heating the layers to cause them to combine thermochemically to form a stoichiometric polycrystalline indium antimonide or indium arsenide semiconductor layer, the thicknesses of the antimony or arsenic and indium layers and of the conductive coating being selected so that the resistance of the latter is much higher than that of the semi-conductor layer, and the substrate being capable of withstanding the heating required to combine the elemental layers.

2. The method claimed in claim 1 wherein the total thickness of the layers is at least 4 microns.

3. The method claimed in claim 1 wherein the substrate comprises an amorphous electrical insulator.

4. The method claimed in claim 1 wherein the substrate incorporates magnetic material and provides insulation between the magnetic material and the semiconductor.

5. The method claimed in claim 1 wherein the coating and the elemental layers are formed by vacuum deposition.

6. The method claimed in claim 5 wherein, before said coating and said layers are formed, the substrate is de-gassed by heating under low pressure.

7. The method claimed in claim 6 wherein said low pressure is about $10^{-6}$ Torr or lower.

8. The method claimed in claim 5 wherein the layers are combined by heating in an inert gas above atmospheric pressure.

9. The method claimed in claim 8 wherein the layers are heated to about 550°C and then allowed to cool.

10. The method claimed in claim 5 wherein the electrically conductive coating is a chromium coating less that 1,000 A units thick.

11. The method claimed in claim 10 wherein an antimony or arsenic layer is formed on the chromium coating, and the indium layer is then formed on the antimony or arsenic layer.

12. The method claimed in claim 1 wherein electrically conductive strips are formed on a surface of the semi-conductor remote from the substrate.

13. The method claimed in claim 12 wherein parts of the semi-conductor are removed to provide through the semi-conductor a current path of desired resistance, parts of said coating and of said strips being also removed, the remaining parts of the strips being generally perpendicular to said current path.

14. The method claimed in claim 12 wherein said strips are indium strips.

15. The method claimed in claim 14 wherein the indium strips are formed by applying a coating of indium to said surface, and then etching away parts of the indium.

16. The method claimed in claim 15 wherein the indium strips are about 2500 A thick.

17. The method claimed in claim 15 wherein the coating of indium is formed on the semiconductor under low pressure.

18. A thin film magneto-resistor, comprising a heat resistant substrate, a current path defined by a semiconductor layer of polycrystalline indium antimonide or indium arsenide, and an electrically conductive coating bonding the semi-conductor layer to an insulating layer formed by the substrate, the electrical resistance of the coating being much higher than that of the semi-conductor layer.

19. A magneto-resistor according to claim 18, wherein magnetic material is incorporated in the substrate beneath said insulating layer.

20. A magneto-resistor according to claim 18, further comprising electrically conductive strips bonded to that surface of the semi-conductor layer remote from the substrate, said strips extending generally transversely of the current path.

21. A magneto-resistor as claimed in claim 20 wherein the electrically conductive coating is chromium.

22. A magneto-resistor as claimed in claim 21 wherein the intermediate coating is less than 1,000 A units thick and the electrically conductive strips are about 2,500 A units thick.

* * * * *